United States Patent

Shohi et al.

[11] Patent Number: 5,415,909
[45] Date of Patent: May 16, 1995

[54] INTERLAYER FILM AND LAMINATED GLASS USING THE SAME

[75] Inventors: Hajime Shohi; Naoki Ueda; Akihiko Bando, all of Mishima, Japan

[73] Assignee: Sekisui Chemical Co., Ltd., Osaka, Japan

[21] Appl. No.: 167,089

[22] Filed: Dec. 16, 1993

[30] Foreign Application Priority Data

Dec. 17, 1992 [JP] Japan ............................. 4-337068
Apr. 21, 1993 [JP] Japan ............................. 5-094473
Apr. 21, 1993 [JP] Japan ............................. 5-094475

[51] Int. Cl.$^6$ ............................................. B32B 9/00
[52] U.S. Cl. ................................. 428/34; 428/212; 428/339; 428/412; 428/425.6; 428/426; 428/432; 428/447; 428/500; 428/911
[58] Field of Search ............... 428/426, 34, 432, 339, 428/437, 447, 425.6, 911, 212, 429, 500, 412

[56] References Cited

U.S. PATENT DOCUMENTS

| | | | |
|---|---|---|---|
| 4,027,061 | 5/1977 | Cartier et al. | 428/213 |
| 4,137,364 | 1/1979 | Ball, III et al. | 428/412 |
| 4,963,614 | 10/1990 | Ito et al. | 524/495 |

FOREIGN PATENT DOCUMENTS

| | | |
|---|---|---|
| 0517114 | 5/1992 | European Pat. Off. . |
| 59-078958 | 5/1984 | Japan . |
| 2051675 | 6/1980 | United Kingdom . |

*Primary Examiner*—Patrick J. Ryan
*Assistant Examiner*—Abraham Bahta
*Attorney, Agent, or Firm*—Townsend & Banta

[57] ABSTRACT

The interlayer film comprises 100 weight parts of ethylene-vinyl acetate copolymer or ethylene-alkyl(meth)acrylate copolymer, 0.01 to 4 weight parts of a transparency improvement agent, and 0.01 to 4 weight parts of a silane coupling agent which contains one or more types of groups selected from amino groups, glycidyl groups and mercapto groups. The laminated glass comprises said interlayer film laminated between 2 transparent plates selected from glass plates and synthetic resin plates.

18 Claims, No Drawings

INTERLAYER FILM AND LAMINATED GLASS USING THE SAME

FIELD OF THE INVENTION

This invention relates to an interlayer film and laminated glass using the same. More specifically, this invention relates to an interlayer film which has the following characteristics when used as an interlayer film, and laminated glass using the same, i.e.: the interlayer film can be stored as a roll at room temperature; it requires no humidity control before a laminating process with glass plates or transparent synthetic resin plates such as polycarbonate resinplates and acrylic resin plates, and the lamination process is easy and does not require an autoclave; it has a good transparency after the lamination process; and it has improved adhesive property to glass plates and transparent synthetic resin plates.

BACKGROUND OF THE INVENTION

Laminated glass is used for automobile safety glass, glazing materials for public facilities and sports/excercise facilities, partitions and security doors. Laminated glass is prepared by replacing a plurality of inorganic glass plates, or some of them, with organic glass, i.e. synthetic resin plates, and laminating them via interlayer films.

Laminated glass in this invention refers to a plurality of transparent plates, comprising glass plates and polycarbonate resin plates or acrylic resin plates, joined together via interlayer films.

For interlayer films for laminated glass, polyvinylbutyral resin plasticized by the addition of a plasticizer, which has a combination of superior adhesion to glass, tough tensile strength and a high degree of transparency, has been used as the most common material.

However, when an interlayer film of this resin is stored as a roll, it is necessary to store it at 5° C. or lower, or to use releasing paper to prevent blocking, because it shows strong self-adhesion at 10° C. or higher temperatures. Furthermore, butyral resin needs to be adjusted for humidity before the lamination process with glass, and the lamination process requires an autoclave. These complicate the lamination process. Also, when this interlayer film is used to laminate synthetic resin transparent plates, the plasticizer in the interlayer film bleeds into the interface with the synthetic resin plate, thus making the adhesion insufficient and at the same time turning the synthetic resin plate white by erosion.

In order to overcome these shortcomings, modified ethylene-vinyl acetate copolymer (Japanese Patent Publication No. 72-2103) and a laminated glass prepared by heating (hardening) a thermosetting resin composition comprising ethylene-vinyl acetate copolymer and organic peroxide during the lamination process (Japanese Patent Publication No. 90-53381) have been proposed.

However, since the former is an ethylene-vinyl acetate modified with acid, it has shortcomings in that: the acid causes higher hygroscopicity; the adhesive property to glass and synthetic resin plates is poor; and crystallinity lowers transparency (the haze value in particular).

On the other hand, for the latter: the transparency improves because the crystallinity decreases during the thermal modification; room temperature storage is possible; humidity control is not necessary; and lamination can be done without using an autoclave. However, since it utilizes radical generated from the decomposition of organic peroxide, it requires a high process temperature, 130° C. or higher, so that it requires heat resistant dyes when used for ornamental laminated glass, leading to poor workability and higher costs. It also has the shortcoming of thermal deformation when used for synthetic resin plates.

Japanese Laid-open Patent Publication No. 92-362046 describes the addition of a nucleating agent (transparency improvement agent), such as dibenzylidenesorbitol, to thermosetting resin comprising ethylene-vinyl acetate copolymer, hydrocarbon resin and organic peroxide blended together. However, this is not sufficient in terms of impact resistance and adhesive property.

Therefore, no prior art interlayer film described thus far satisfies all the requirements for use for laminated glass, such as lamination process characteristics, transparency and adhesive property.

SUMMARY OF THE INVENTION

Based on the evaluation above, the object of this invention is to provide an interlayer film and laminated glass which uses it wherein said interlayer film can be stored as a roll at 50° C. or lower temperatures, and allows the lamination process at an appropriate temperature with no humidity control and no autoclave, without sacrificing the basic characteristics required for laminated glass, such as transparency, weather resistance, shock energy absorption and adhesive property to synthetic resin plates.

This invention provides an interlayer film comprising 100 weight parts of ethylene-vinyl acetate copolymer, 0.01 to 4 weight parts of a transparency improvement agent, and 0.01 to 4 weight parts of a silane coupling agent which contains one or more types of groups selected from amino groups, glycidyl groups and mercapto groups.

For said ethylene-vinyl acetate copolymer, the vinyl acetate content is preferably 5 to 50 wt %, and the weight average molecular weight is preferably $1 \times 10^4$ to $30 \times 10^4$.

0.5 to 20 weight parts of ethylene-vinyl acetate copolymer with a vinylacetate content of 5 to 35 wt % and a weight average molecular weight of $5 \times 10^2$ to $30 \times 10^2$ may be added to 100 weight parts of said ethylene-vinyl acetate copolymer.

Also, this invention provides an interlayer film comprising 100 weight parts of ethylene-alkyl(meth)acrylate copolymer, 0.01 to 4 weight parts of a transparency improvement agent, and 0.01 to 4 weight parts of a silane coupling agent which contains one or more types of groups selected from amino groups, glycidyl groups and mercapto groups.

For said ethylene-alkyl(meth)acrylate copolymer, the alkyl(meth) acrylate content is preferably 5 to 50 wt %, and the weight average molecular weight is preferably $1 \times 10^4$ to $30 \times 10^4$.

0.5 to 20 wt weight parts of alkyl(meth)acrylate copolymer with alkyl(meth)acrylate content of 5 to 35 wt % and a weight average molecular weight of $5 \times 10^2$ to $30 \times 10^2$ may be added to 100 weight parts of said alkyl(meth)acrylate copolymer.

Said transparency improvement agent is, for example, a condensation reaction product of polyhydric alcohol of 5 to 12-hydric or its derivative and twice as many equivalents of benzaldehyde or its derivative. Said polyhydric alcohol is one or more types of polyhydric alcohol selected from sorbitol, xylitol, mannitol and dulcitol.

Said condensation reaction product is, for example, a dibenzylidenesorbitol compound represented by general equation (I).

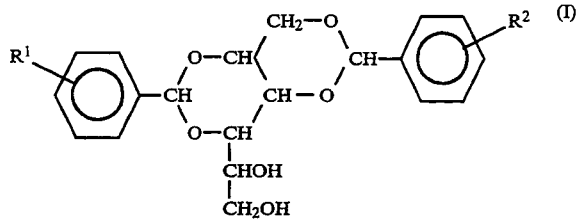

(in this equation, $R^1$ and $R^2$ stand for hydrogen atoms, chlorine atoms, or alkyl groups with a carbon number of 1 to 6. $R^1$ and $R^2$ can be either identical or different.)

Said transparency improvement agent is, for example, a calixarene represented by general equation (II).

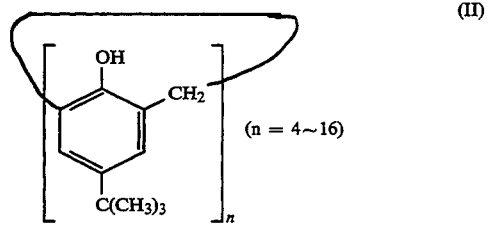

Said silane coupling agent containing amino group(s) is, for example, selected from 3-aminopropyldimethylethoxysilane, 3-aminopropylmethyldiethoxysilane, 3-aminopropyltrimethoxysilane, 3-aminopropyltriethoxysilane, N-(2-aminoethyl)-3-aminopropylmethyldimethoxysilane and N-(2-aminoethyl)-3-aminopropyltrimethoxysilane.

Said silane coupling agent containing glycidyl group(s) is, for example, selected from 3-glycidoxypropyldimethylethoxysilane, (3-glycidoxypropyl)methyldiethoxysilane and 3-glycidoxypropyltrimethoxysilane.

Said silane coupling agent containing mercapto group(s) is, for example, selected from mercaptomethyldimethylethoxysilane, (mercaptomethyl)metyldiethoxysilane, 3 -mercaptopropylmethyldimethoxysilane, 3-mercaptopropyltrimethoxysilane and 3-mercaptopropyltriethoxysilane.

This invention also provides laminated glass formed by laminating, between 2 transparent plates selected from glass plates and synthetic resin plates, an interlayer film comprising 100 weight parts of ethylene-vinyl acetate copolymer, 0.01 to 4 weight parts of a transparency improvement agent, and 0.01 to 4 weight parts of a silane coupling agent which contains one or more types of groups selected from amino groups, glycidyl groups and mercapto groups.

This invention also provides laminated glass formed by laminating, between 2 transparent plates selected from glass plates and synthetic resin plates, an interlayer film comprising 100 weight parts of ethylene-alkyl(-meth)acrylate copolymer, 0.01 to 4 weight parts of a transparency improvement agent, and 0.01 to 4 weight parts of silane coupling agent which contains one or more types of groups selected from amino groups, glycidyl groups and mercapto groups.

DETAILED DESCRIPTION OF THE INVENTION

A more detailed description of this invention is given below.

The ethylene-vinyl acetate polymer or ethylene-alkyl(meth)acrylate copolymer used in this invention is prepared with a prior art method such as the high pressure method and the emulsification method. Transparency and mechanical properties differ depending on its vinyl-acetate content, or alkyl(meth)acrylate content. For example, the suitable range of the vinylacetate content, or the alkyl(meth)acrylate content, is 5 to 50 wt %. More preferable is 10 to 40 wt %, and the most preferable is 15 to 35 wt %. If the content is more than 50 wt %, then the transparency is good, but the tensile property is poor, i.e. the breaking-point strength is low, and thus the polymer is not suitable for the interlayer film for laminated glass. If the content is less than 5 wt %, then the tensile property is expected to be good, but the incipient fluidization temperature increases to deteriorate the lamination processability, and the transparency may decrease significantly.

The suitable range of the weight average molecular weight of the ethylene-vinyl acetate copolymer or ethylene-alkyl(meth)acrylate copolymer is $1 \times 10^4$ to $30 \times 10^4$. More preferable is $5 \times 10^4$ to $25 \times 10^4$, and the most preferable is $10 \times 10^4$ to $20 \times 10^4$. If the weight average molecular weight is less than $1 \times 10^4$, then the fluidity becomes excessively high, and if it is more than $30 \times 10^4$, then the fluidity decreases and the lamination process will be difficult.

If the melt index (MI) of the ethylene-vinyl acetate copolymer or ethylene-alkyl(meth)acrylate copolymer is too low, then the fluidity of the resin composition decreases and the processability (deaeration, process time) becomes significantly poor. If it is too high, then the viscosity of the resin composition decreases and the impact resistance of the laminated glass obtained will decrease, and the interlayer film may bulge out from the edges or may becomes thinner. Therefore, a preferable range is 0.1 to 500 g/10-minutes (ASTM 1238-65T), and more preferable is 1 to 200 g/10-minutes.

0.5 to 20 weight parts of ethylene-vinyl acetate copolymer or ethylene-alkyl(meth)acrylate copolymer (hereafter referred to as "copolymer B") with a vinyl-acetate content, or alkyl(meth)acrylate content, of 5 to 35 wt % and a weight average molecular weight of $5 \times 10^2$ to $30 \times 10^2$ may be added to 100 weight parts of said ethylene-vinyl acetate copolymer or ethylene-alkyl(meth)acrylate (hereafter referred to as "copolymer A"). If the weight average molecular weight of copolymer B is less than $5 \times 10^2$, then the fluidity of the interlayer film composition becomes too high to cause problems in the lamination process. If it is more than $30 \times 10^2$, then there will be no improvement in transparency. If the vinylacetate content, or alkyl (meth)acrylate content, in copolymer B is less than 5 wt %, then the improvement in transparency will be insufficient. If it is more than 35 wt %, the tensile properties of the interlayer film composition will be insufficient. Furthermore, if the amount of added copolymer B is less than 0.5 weight parts, then the improvement in transparency will be insufficient. If it is more than 20 weight parts, then compatibility with said copolymer A becomes poor, leading to a reduction in the transparency of the laminated glass.

Examples of alkyl(meth)acrylate in the ethylene-alkyl(meth)acrylate copolymer used in this invention would be methyl-alkyl(meth)acrylate, ethyl(meth)acrylate, butyl(meth)acrylate, 2-ethylhexyl(meth)acrylate and etc. They can be used individually or in combination.

For the transparency improvement agent in this invention, a condensation reaction product of polyhydric alcohol of 5 to 12-hydric and its derivative and twice as many equivalents of benzaldehyde and its derivative may be used. If the amount of benzaldehyde is less than twice as many equivalents, then a large amount of monoacetalized compound will be produced, and if it is more than twice as many equivalents, then a large amount of hemiacetalized compound will be produced. Either way, these byproducts hamper improvement of the transparency.

This condensation reaction product is synthesized in the following manner, as described in Japanese Patent Publication No. 65-15489 and No. 72-7460: under the presence of inert gas, polyhydric alcohol of 5 to 12-hydric and its derivatives are put into a reactor equipped with cooling pipes and an agitator, then twice as many equivalents of benzaldehyde and its aldehyde derivative are put into the reactor, and a condensation catalyst such as sulfuric acid is added, followed by a heated reaction for synthesis.

Typical examples of the polyhydric alcohol and its derivatives used in this invention would be sorbitol (glucitol), xylitol, mannitol, dulcitol, sorbose, arabinitol, ribitol, fructose and etc. In particular, a consensation reaction product obtained from sorbitol, xylitol, mannitol and dulcitol improves the transparency significantly. These can be used individually or in combination.

Examples of benzaldehyde and its aldehyde derivatives used in this invention would be substitution products of benzaldehyde with chlorine atoms, alkyl groups and alkoxy groups. Specific examples are chlorobenzaldehyde, methylbenzaldehyde, ethylbenzaldehyde, propylbenzaldehyde, butylbenzaldehyde, pentylbenzaldehyde, hexylbenzaldehyde, methoxybenzaldehyde, ethoxybenzaldahyde, propoxybenzaldehyde, pentoxybenzaldehyde, butoxybenzaldehyde and hexyloxybenzaldehyde, wherein substituted positions in the benzene nuclear are the ortho position, matha position or para position. Other examples are 2,4,5-trimethylbenzaldehyde, 2,4-dimethylbenzaldehyde, 2,6-dichlorobenzaldehyde, 2,3,6-trichlorobenzaldehyde, 3-methyl, 5-chlorobenzaldehyde and etc. These can be used individually or in combination.

Examples of the condensation acid catalyst used in the synthesis of said condensation reaction products would be sulfuric acid, p-toluenesulfonic acid, phosphoric acid, hydrochloric acid and zinc chloride.

Said condensation reaction product is, for example, a dibenzylidenesorbitol compound represented by general equation (I).

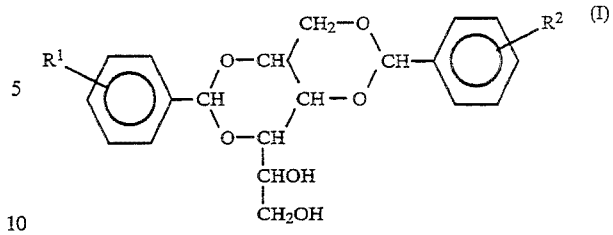

(in this equation, $R^1$ and $R^2$ stand for hydrogen atoms, chlorine atoms, or alkyl groups with a carbon number of 1 to 6. $R^1$ and $R^2$ can be either identical or different.) If the carbon number of this alkyl group is too high, then the transparency of the transparent lamination obtained will decrease.

Examples of the dibenzylidenesorbitol compound described above would be dibenzylidenesorbitol, bis(-methylbenzylidene)sorbitol, bis(ethylbenzylidene)sorbitol, bis(propylbenzylidene)sorbitol, bis(butylbenzylidene)sorbitol, bis(pentylbenzylidene)sorbitol, bis(-hexylbenzylidene)sorbitol, bis(chlorobenzylidene)sorbitol, bis(ethylbenzylidene)xylitol, dibenzylidenedulcitol, dibenzylidenemannitol and etc. These can be used individually or in combination.

The amount of the condensation reaction product to be added should be 0.01 to 4 weight parts for 100 weight parts of ethylene-vinyl acetate copolymer or ethylene-alkyl(meth)acrylate copolymer. The more preferable range is 0.02 to 2 weight parts, and the most preferable range is 0.05 to 1 weight parts. If it is less than 0.01 weight parts, then improvement of the transparency is not sufficient. The addition of more than 4 weight parts will result in significant reduction of the fluidity properties (melt index), and poor tensile properties.

It is possible to add a nucleating agent such as tribenzylidenesorbitol, sodium bis(4-t-butylphenyl)phosphate, and hydroxy-di(t-butylbenzoic acid)aluminum to said condensation reaction products to improve the transparency of the interlayer film, as long as the amount is in the range which does not damage the physical properties of the interlayer film.

Another example of the transparency improvement agent used in this invention is, for example, a calixarene represented by general equation (II).

$$\left[ \begin{array}{c} \text{OH} \\ \text{CH}_2 \\ \text{C(CH}_3\text{)}_3 \end{array} \right]_n \quad (n = 4\sim 16) \quad (II)$$

The calixarene can be prepared with a prior art (Accounts of Chemical Research, 16, 161 (1983)).

Examples of the calixarene are 4-t-butylcalix[4]arene, 4-t-butylcalix[5]arene, 4-t-butylcalix[6]arene, 4-t-butylcalix[7]arene, 4-t-butylcalix[8]arene, 4-t-butylcalix[9]arene, 4-t-butylcalix[10]arene, 4-t-butylcalix[11]arene, 4-t-butylcalix[12]arene, 4-t-butylcalix[13]arene, 4-t-butylcalix[14]arene, 4-t-butylcalix[15]arene and 4-t-butylcalix[16]arene. In particular, the calixarene with n of 4 to 8 in equation (II) is preferable because it diffuses well into the resin.

The amount of the calixarene described above to be added should be 0.01 to 4 weight parts for 100 weight parts of ethylene-vinyl acetate copolymer or ethylene-alkyl(meth)acrylate copolymer. More preferable range is 0.02 to 1 weight parts, and the most preferable range is 0.03 to 0.5 weight parts. If it is less than 0.01 weight parts, then improvement of the transparency is not sufficient. The addition of more than 4 weight parts will reduce the transparency also.

Typical examples of the silane coupling agent with amino groups, glycidyl groups or mercapto groups which is used in this invention are: silane coupling agents containing areinc group(s), such as 3-aminopropyldimethylethoxysilane, 3-aminopropylmethyldiethoxysilane, 3-aminopropyltrimethoxysilane, 3-aminopropyltriethoxysilane, N-(2-aminoethyl)-3-aminopropylmethyldimethoxysilane, N-(2-aminoethyl)-3-aminopropyltrimethoxysilane, etc.; silane coupling agents containing glycidyl group(s), such as 3-glycidoxypropyldimethylethoxysilane, (3-glycidoxypropyl)methyldiethoxysilane, 3-glycidoxypropyltrimethoxysilane, etc.; and silane coupling agents containing mercapto group(s), such as mercaptomethyldimethylethoxysilane, (mercaptomethyl)methyldiethoxysilane, 3-mercaptopropylmethyldimethoxysilane, 3-mercaptopropyltrimethoxysilane, 3-mercaptopropyltriethoxysilane, etc. In particular, silane coupling agents with amino groups are superior in the adhesive durability. These can be used individually or in combination.

The amount of these silane coupling agents to be added should be 0.01 to 4 weight parts for 100 weight parts of ethylene-vinyl acetate copolymer or ethylene-alkyl(meth)acrylate copolymer. More preferable range is 0.02 to 1 weight parts, and the most preferable range is 0.03 to 0.5 weight parts. The addition of more than 4 weight parts will result in a reduction of transparency of the transparent lamination obtained. If the amount is less than 0.01 weight parts, then improvement of the adhesion cannot be achieved.

In order to prevent deterioration of the interlayer film, a heat stabilizer, antioxidant, ultraviolet light absorbent, etc., can be added within the range which does not damage the physical properties of the interlayer film.

Examples of the heat stabilizer mentioned above are calcium stearate, dialkanol aliphatic tertiary amine, etc.

Examples of the antioxidant mentioned above are t-butylhydroxytoluene, tetrakis-[methylene-3-(3'-5'di-t-butyl-4'-hydroxyphenyl)propionate]methane, IRGANOX 1010®, IRGANOX 1076® available from Chiba-Geigy and etc.

Examples of the ultraviolet light absorbent are benzotriazole types, hindered amine types and benzophenone types. Preferably used benzotriazole types are 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'methylphenyl)-5-chlorobenzotriazole, 2-(2'-hydroxy-3',5'-di-t-amylphenyl)benzotriazole, TINUVIN P®, TINUVIN 320®, TINUVIN 326® and TINUVIN 328® available from Chiba-Geigy and etc. Preferable hindered amine types are LA-57 ® available from Adecaagas Co., LS-770 ® and LS-2626 ® available from Sankyo Co., Ltd. and etc. Preferable benzophenone types are SEESORB 101®, SEESORB 102®, SEESORB 103®, SEESORB 104 ® available from SHIPRO Chemical Co., and etc.

In order to manufacture the interlayer film of this invention, it is necessary to uniformly mix the ethylene-vinyl acetate copolymer or ethylene-alkyl(meth)acrylate copolymer, the transparency improvement agent and the silane coupling agent. Examples of the mixing method follow: melt-kneading using a kneader such as a roll mill; the dry blend method which directly mixes the pellets of the ethylene-vinyl acetate copolymer or ethylene-alkyl(meth)acrylate copolymer with other ingredients; and extrusion molding using the high concentration master batch method, which dilutes the master batch pellets of the ethylene-vinyl acetate copolymer or ethylene-alkyl(meth)acrylate copolymer containing high concentrations of other ingredients with pellets of the ethylene-vinyl acetate copolymer or ethylene-alkyl(meth)acrylate copolymer to obtain molding with the prescribed concentrations. The resin composition obtained by such melt-kneading is then made into a interlayer film by the calender roll method, the extrusion sheet casting method, the inflation tube method, etc.

If the interlayer film mentioned above is too thin, then the impact resistance of the laminated glass obtained will decrease, and if it is too thick, then the transparency of the laminated glass obtained will decrease. Therefore, 50 micrometers to 1 mm is a preferable range.

An example of the method of manufacturing laminated glass using this interlayer film follows. First, the interlayer film is placed between two 3-mm-thick transparent plates, already cleaned in advance, selected from glass plates and synthetic resin plates, and this lamination is put into a rubber bag. After deaeration for a prescribed duration at a vacuum of 0 to 20 torr, it is transferred to an oven at 80° C. to 120° C. while in a deaerated state, and then kept heated at 80° C. to 120° C. in this oven to obtain the laminated glass. Or, this lamination is fed into pressurizing rubber rolls, which is heated to 100° C. or higher, for a prescribed amount of time and press-bonded to obtain the laminated glass. The interlayer film in the laminated glass thus obtained maintains adhesive strength and stays as a flexible film.

The interlayer film of this invention can also be double-layered to make a multi-layered laminated glass. For double-layering, when there are at least two rigid plates of metal or inorganic material, other than glass plates and synthetic plates, it is possible to insert polymer films with low rigidity such as polyester films and polyurethane films, or paper in intermediate layers or outer layers.

Examples of such multi-layered laminated glass are:
(1) Glass plate/interlayer film/polymer film/interlayer film/glass plate
(2) Glass plate/interlayer film/metal plate/interlayer film/glass plate/polymer film
(3) Glass plate/interlayer film/paper/interlayer film/glass plate
(4) Synthetic resin plate/interlayer film/polymer film/interlayer film/synthetic resin plate
(5) Synthetic resin plate/interlayer film/metal plate/interlayer film/synthetic resin plate/polymer film
(6) Synthetic resin plate/interlayer film/paper/interlayer film/synthetic resin plate.

The interlayer film of this invention has superior transparency and adhesive property to glass plate and synthetic resin plates, and allows a lamination process with no autoclave, without sacrificing the impact resistance, which is a basic characteristic of an interlayer film, and therefore it has significant advantages in terms of performance and processability.

PREFERRED EMBODIMENTS

Examples of this invention and comparative examples are described below. The basic characteristics of the synthetic resin laminated glass obtained are also shown. Hereafter, "part(s)" means "weight part (s)".

[EXAMPLE 1]

(1) Preparation of the interlayer film 100 parts of a ethylene-vinyl acetate copolymer with a vinyl acetate content of 28 wt % and a melt index (MI) of 6 g/10 minutes (Ultrasen ® 751 available from Tosoh Co.), 0.1 parts of dibenzylidene sorbitol and 0.2 parts of N-(2-aminoethyl)-3-aminopropylmethyldimethoxysilane were fed into a roll mill, and melt-kneaded at 200° C. to obtain the resin composition.

35 parts of the resin composition obtained was sandwiched between two 0.1-mm-thick polyethylene terephthalate films, and the sandwich obtained was press-molded at 150° C. and at a pressure of 120 kg/cm² for 30 minutes with a press-molding machine to obtain a resin sheet comprising a 0.4-mm-thick interlayer and the polyethylene terephthalate films laminated on both sides. The resin sheet obtained was let stand to cool until the temperature was down to 20° C.

(2) Preparation of the laminated glass

The polyethylene terephthalate films on both sides of the resin sheet obtained were peeled off, and 30 cm depth, 30 cm wide and 3 mm thick float glass plates were laminated on both sides to obtain a lamination. The lamination obtained was then put into a vacuum bag and deaerated at a 10 torr vacuum for 20 minutes, and the vacuum bag with the lamination in it, still in the deaerated state, was transferred into an oven, where it was kept for 30 minutes at 100° C. to obtain laminated glass.

(3) Preparation of glass samples for the adhesion strength measurement

The polyethylene terephthalate film on one side of the resin sheet obtained was peeled off, and a 3 mm thick float glass plate was laminated on the peeled surface. The lamination obtained was then put into a vacuum bag and deaerated at a 10 torr vacuum for 20 minutes, and the vacuum bag with the lamination in it, still in the deaerated state, was transferred into an oven, where it was kept for 30 minutes at 100° C. The lamination was then cut into 2 cm wide, 10 cm long strips to obtain samples for the adhesion strength measurement.

[EXAMPLES 2 to 40, COMPARATIVE EXAMPLES 1 TO 25]

The interlayer films were obtained in the same way as in Example 1, except for the fact that prescribed amounts of ethylene-vinyl acetate copolymer or ethylene-alkyl(meth)acrylate copolymer, dibenzylidenesorbitol compound(s) or calixarene, and silane coupling agent(s), as shown in Tables 1 to 4, were used. Laminated glass and the samples for adhesion strength measurement were obtained by using glass plate or synthetic resin plates, as indicated in the tables. Only Comparative Example 24 has an oven temperature of 130° C.

TABLE 1

| | Copolymer | | Transparency improvement agent | | Silane coupling agent | | Glass plate or synthetic resin plate |
| --- | --- | --- | --- | --- | --- | --- | --- |
| | Type | Weight parts | Type | Weight parts | Type | Weight parts | Type |
| Example 1 | EVA - 1 | 100 | B - 1 | 0.2 | S - 1 | 0.1 | G |
| Example 2 | EVA - 2 | 100 | B - 1 | 0.2 | S - 1 | 0.2 | G |
| Example 3 | EVA - 3 | 100 | B - 1 | 0.2 | S - 3 | 0.5 | G |
| Example 4 | EVA - 4 | 100 | B - 1 | 0.098 | S - 4 | 0.2 | G |
| | | | B - 11 | 0.002 | | | |
| Example 5 | EVA - 5 | 100 | B - 1 | 2.0 | S - 1 | 0.2 | G |
| Example 6 | EVA - 6 | 100 | B - 2 | 0.1 | S - 5 | 0.2 | G |
| Example 7 | EVA - 1 | 100 | B - 3 | 0.1 | S - 3 | 0.5 | G |
| Example 8 | EVA - 6 | 100 | B - 4 | 0.1 | S - 5 | 0.2 | G |
| Example 9 | EVA - 5 | 100 | B - 4 | 2.0 | S - 1 | 0.2 | G |
| Example 10 | EVA - 1 | 100 | B - 5 | 0.1 | S - 3 | 0.5 | G |
| Example 11 | EVA - 3 | 100 | B - 5 | 0.2 | S - 3 | 0.5 | G |
| Example 12 | EVA - 1 | 100 | B - 6 | 0.1 | S - 2 | 0.2 | G |
| Example 13 | EVA - 1 | 100 | C - 1 | 0.03 | S - 2 | 0.1 | G |
| Example 14 | EVA - 6 | 100 | C - 1 | 0.1 | S - 2 | 0.05 | G |
| Example 15 | EVA - 4 | 100 | C - 1 | 0.5 | S - 3 | 0.1 | G |
| Example 16 | EVA - 2 | 100 | C - 2 | 0.01 | S - 4 | 0.1 | G |
| Example 17 | EVA - 3 | 100 | C - 2 | 0.3 | S - 5 | 0.2 | G |
| Example 18 | E-A - 2 | 100 | C - 1 | 0.2 | S - 1 | 0.2 | G |
| Example 19 | E-A - 3 | 100 | C - 3 | 0.3 | S - 4 | 0.5 | G |
| Example 20 | EVA - 1 | 100 | B - 1 | 0.2 | S - 1 | 0.1 | PC |

TABLE 2

| | Copolymer | | Transparency improvement agent | | Silane coupling agent | | Glass plate or synthetic resin plate |
| --- | --- | --- | --- | --- | --- | --- | --- |
| | Type | Weight parts | Type | Weight parts | Type | Weight parts | Type |
| Example 21 | EVA - 1 | 100 | C - 1 | 0.2 | S - 1 | 0.1 | PC |
| Example 22 | E-A - 1 | 100 | B - 1 | 0.2 | S - 1 | 0.2 | PC |
| Example 23 | EVA - 2 | 100 | B - 1 | 0.05 | S - 1 | 0.2 | G |
| | EVA - 11 | 10 | | | | | |
| Example 24 | EVA - 7 | 100 | B - 1 | 0.2 | S - 1 | 0.1 | G |
| | EVA - 12 | 5 | | | | | |
| Example 25 | EVA - 1 | 100 | B - 1 | 0.3 | S - 1 | 0.1 | G |
| | EVA - 12 | 10 | | | | | |
| Example 26 | EVA - 1 | 100 | B - 1 | 0.3 | S - 1 | 0.1 | G |

TABLE 2-continued

| | Copolymer | | Transparency improvement agent | | Silane coupling agent | | Glass plate or synthetic resin plate |
|---|---|---|---|---|---|---|---|
| | Type | Weight parts | Type | Weight parts | Type | Weight parts | Type |
| | EVA - 13 | 10 | | | | | |
| Example 27 | EVA - 1 | 100 | C - 1 | 0.1 | S - 4 | 0.2 | G |
| | EVA - 12 | 10 | | | | | |
| Example 28 | E-A - 1 | 100 | B - 1 | 0.2 | S - 1 | 0.2 | G |
| Example 29 | E-A - 2 | 100 | B - 1 | 2.0 | S - 1 | 0.2 | G |
| Example 30 | E-A - 3 | 100 | B - 1 | 0.2 | S - 3 | 0.5 | G |
| Example 31 | E-A - 4 | 100 | B - 1 | 0.098 | S - 4 | 0.2 | G |
| | | | B - 11 | 0.002 | | | |
| Example 32 | E-A - 1 | 100 | B - 6 | 0.2 | S - 1 | 0.2 | G |
| Example 33 | E-A - 2 | 100 | B - 5 | 2.0 | S - 1 | 0.2 | G |
| Example 34 | E-A - 3 | 100 | B - 5 | 0.2 | S - 3 | 0.5 | G |
| Example 35 | E-A - 1 | 100 | B - 1 | 0.3 | S - 4 | 0.3 | G |
| | E-A - 11 | 10 | | | | | |
| Example 36 | E-A - 1 | 100 | B - 1 | 0.3 | S - 5 | 0.1 | G |
| | E-A - 21 | 10 | | | | | |
| Example 37 | E-A - 1 | 100 | C - 1 | 0.1 | S - 3 | 0.2 | G |
| | E-A - 11 | 10 | | | | | |
| Example 38 | E-A - 2 | 100 | C - 1 | 0.2 | S - 1 | 0.2 | PC |
| Example 39 | E-A - 1 | 100 | B - 1 | 0.3 | S - 4 | 0.3 | M |
| | E-A - 11 | 10 | | | | | |
| Example 40 | E-A - 1 | 100 | B - 1 | 0.3 | S - 1 | 0.1 | M |
| | E-A - 13 | 10 | | | | | |

TABLE 3

| | Copolymer | | Transparency improvement agent | | Silane coupling agent | | Glass plate or synthetic resin plate |
|---|---|---|---|---|---|---|---|
| | Type | Weight parts | Type | Weight parts | Type | Weight parts | Type |
| Comparative Example 1 | EVA - 1 | 100 | — | — | — | — | G |
| Comparative Example 2 | EVA - 1 | 100 | B - 1 | 0.2 | — | — | G |
| Comparative Example 3 | EVA - 1 | 100 | — | — | S - 1 | 0.1 | G |
| Comparative Example 4 | EVA - 1 | 100 | C - 1 | 0.05 | — | — | G |
| Comparative Example 5 | EVA - 1 | 100 | — | — | — | — | G |
| | EVA - 11 | 10 | | | | | |
| Comparative Example 6 | EVA - 1 | 100 | B - 1 | 0.2 | — | — | G |
| | EVA - 11 | 10 | | | | | |
| Comparative Example 7 | EVA - 1 | 100 | — | — | S - 1 | 0.1 | G |
| | EVA - 11 | 10 | | | | | |
| Comparative Example 8 | EVA - 1 | 100 | C - 1 | 0.05 | — | — | G |
| | EVA - 11 | 10 | | | | | |
| Comparative Example 9 | E-A - 1 | 100 | — | — | — | — | G |
| Comparative Example 10 | E-A - 1 | 100 | B - 1 | 0.2 | — | — | G |
| Comparative Example 11 | E-A - 1 | 100 | — | — | S - 1 | 0.1 | G |
| Comparative Example 12 | E-A - 1 | 100 | C - 1 | 0.05 | — | — | G |
| Comparative Example 13 | E-A - 1 | 100 | — | — | — | — | G |
| | E-A - 11 | 10 | | | | | |
| Comparative Example 14 | E-A - 1 | 100 | B - 1 | 0.2 | — | — | G |
| | E-A - 11 | 10 | | | | | |
| Comparative Example 15 | E-A - 1 | 100 | — | — | S - 1 | 0.1 | G |
| | E-A - 11 | 10 | | | | | |

TABLE 4

| | Copolymer | | Transparency improvement agent | | Silane coupling agent | | Glass plate or synthetic resin plate |
|---|---|---|---|---|---|---|---|
| | Type | Weight parts | Type | Weight parts | Type | Weight parts | Type |
| Comparative Example 16 | EVA - 1 | 100 | C - 1 | 0.05 | — | — | G |
| | EVA - 11 | 10 | | | | | |
| Comparative Example 17 | EVA - 1 | 100 | B - 1 | 0.2 | S - 11 | 0.1 | G |
| | EVA - 11 | 10 | | | | | |
| Comparative Example 18 | EVA - 1 | 100 | C - 1 | 0.05 | S - 12 | 0.1 | G |
| | EVA - 11 | 10 | | | | | |
| Comparative Example 19 | EVA - 1 | 100 | B - 1 | 0.2 | S - 1 | 0.001 | G |
| | EVA - 11 | 10 | | | | | |

TABLE 4-continued

| | Copolymer | | Transparency improvement agent | | Silane coupling agent | | Glass plate or synthetic resin plate |
|---|---|---|---|---|---|---|---|
| | Type | Weight parts | Type | Weight parts | Type | Weight parts | Type |
| Comparative Example 20 | EVA - 1<br>EVA - 11 | 100<br>10 | B - 1 | 0.2 | S - 1 | 5.0 | G |
| Comparative Example 21 | EVA - 1<br>EVA - 11 | 100<br>10 | B - 1 | 0.001 | S - 1 | 0.1 | G |
| Comparative Example 22 | EVA - 1<br>EVA - 11 | 100<br>10 | B - 1 | 5.0 | S - 1 | 0.1 | G |
| Comparative Example 23 | | | EVA - 8' (saponificated EVA - 8 modified with phthalic acid) | | | | G |
| Comparative Example 24 | EVA - 4 | 100 | D - 1<br>E - 1 | 3<br>1 | S - 53 | 0.3 | G |
| Comparative Example 25 | EVA - 4 | 100 | D - 1<br>E - 1 | 3<br>3 | S - 53 | 0.3 | G |

The symbols used to indicate compositions and such in the tables shown above are described as below.
(Copolymer)

TABLE 5

| | Ethylene - vinyl acetate copolymer | | | | |
|---|---|---|---|---|---|
| Type | Vinyl acetate content (wt %) | Weight average molecular weight ($\times 10^4$) | MI (g/10 minutes) | Manufacturer | Product name |
| EVA - 1 | 28 | 12 | 6 | Tosoh Co. | ULTRASEN ® 751 |
| EVA - 2 | 32 | 7 | 60 | Sumitomo Chemicals Co. | EVATATE ® 5011 |
| EVA - 3 | 20 | 14 | 1.5 | Tosoh Co. | ULTRASEN ® 631 |
| EVA - 4 | 19 | 17 | 2.5 | Du Pont Mitsui Polychemicals Co. Ltd. | EVAFLEX ® 460 |
| EVA - 5 | 20 | 9 | 20 | Sumitomo Chemicals Co. | EVATATE ® 4011 |
| EVA - 6 | 25 | 13 | 2 | Mitsubishi Petrochemical Co. | EVA X505 |
| EVA - 7 | 15 | 18 | 3 | Sumitomo Chemicals Co. | EVATATE ® 2011 |
| EVA - 11 | 20 | 0.25 | — | | (Synthesized) |
| EVA - 12 | 30 | 0.15 | — | | (Synthesized) |
| EVA - 13 | 15 | 0.15 | — | | (Synthesized) |

EVA-8' (saponificated EVA-8 modified with phthalic acid)

200 parts of ethylene-vinyl acetate copolymer EVA-8 (ULTRASEN ® 750 available from Tosoh Co. with a vinyl acetate content of 32 wt %, weight average molecular weight of $8 \times 10^4$, and MI of 30 g/10 minutes), 300 parts of a 10-wt % sodium hydroxide solution and 1500 parts of xylene were fed into a 5-liter 3-mouth flask with an agitator and a reflux condenser. The hydrolysis reaction was then carried out during agitation and refluxing. The solid portion was collected by filtering to obtain a partially saponificated product with a degree of saponification of 90%. 180 parts of the partially saponificated product, 104 parts of phthalic anhydride, 40 parts of pyridine and 1500 parts of xylene are fed into a 5-liter 3-mouth flask with an agitator and a reflux condenser. The reaction was carried out during agitation and refluxing at 110° C. for 4 hours to obtain a resin. The resin obtained was assayed with the element analysis and the infrared absorption spectral analysis to confirm it had a vinyl acetate content of 3.2 wt %, vinyl alcohol content of 16.1%, vinyl phthalate content of 12.7 wt % and ethylene content of 68 wt %.

TABLE 6

| | Ethylene - alkyl(meth)acrylate copolymer | | | | |
|---|---|---|---|---|---|
| Type | Alkyl(meth) acrylate content (wt %) | Weight average molecular weight ($\times 10^4$) | MI (g/10 minutes) | Manufacturer | Product name |
| E-A - 1 | 20 | 18 | 4 | Sumitomo Chemicals Co. | ACRIFT ® WH202 |
| E-A - 2 | 25 | 15 | 7 | Sumitomo Chemicals Co. | ACRIFT ® Wh402 |
| E-A - 3 | 20 | 12 | 20 | Nippon Unicar Co. Ltd., | DPDJ ® - 9169 |
| E-A - 4 | 25 | 13 | 20 | NIppon Unicar Co. Ltd., | NUC ® - 6570 |
| E-A - 11 | 30 | 0.15 | — | | (Synthesized) |
| E-A - 21 | 15 | 0.15 | — | | (Synthesized) |

(Transparency improvement agent)

TABLE 7

| | Type | Composition name |
|---|---|---|
| Dibenzylidene-sorbitol compounds | B - 1 | Dibenzylidenesorbitol |
| | B - 2 | Bis (methylbenzylidene) sorbitol |
| | B - 3 | Bis (buthylbenzylidene) sorbitol |

TABLE 7-continued

| | Type | Composition name |
|---|---|---|
| | B - 4 | Bis (ethylbenzylidene) xylitol |
| | B - 5 | Dibenzylidenedulcitol |
| | B - 6 | Dibenzylidenemannitol |
| | B - 11 | Tribenzylidenesorbitol |
| Calix - arene | C - 1 | 4-t-butyl calix[4]arene |
| | C - 2 | 4-t-butyl calix[6]arene |
| | C - 3 | 4-t-butyl calix[8]arene |

TABLE 8

| Type | Composition name | Manufacturer | Product name |
|---|---|---|---|
| D - 1 | Triallylisocyanurate | Nippon Kasei Chemical Co. | TAIC ® |
| E - 1 | 1, 1-bis (t-butylperoxy)-3, 3, 5-trimethylcyclohexane | NOF Co. | Perhexa 3M ® |

(Silane coupling agent)

TABLE 9

| Type | Composition name |
|---|---|
| S - 1 | N-(2-aminoethyl)-3-aminopropylmetyldimethoxysilane |
| S - 2 | N-(2-aminoethyl)-3-aminopropyltrimethoxysilane |
| S - 3 | 3-mercaptopropyltrimethoxysilane |
| S - 4 | 3-aminopropyltriethoxysilane |
| S - 5 | 3-glycidoxypropyltrimethoxysilane |
| S - 11 | n-propyltrimethoxysilane |
| S - 12 | vinyltriethoxysilane |
| S - 53 | t-methacryloxypropyltrimethoxysilane |

(Glass or synthetic resin plates)

TABLE 10

| Type | Composition name | Manufacturer | Product name |
|---|---|---|---|
| G | Float glass | — | — |
| PC | Polycarbonate plate | Mitsubishi Gas Chemical Co. | Yupironsheet ® NF2000U |
| M | Poly(methylmethacrylate) plate | Mitsubishi Rayon Co. | Acrylite ® HR |

The laminated glass and the laminated glass samples for adhesion strength measurement obtained in Examples 1 to 40 and Comparative Examples 1 to 25 were evaluated. For the laminated glass, the impact resistance test, the transparency test, the thermal shock test, the moisture resistance test and the boiling test were conducted. For the laminated glass samples for the adhesion strength measurement, the adhesion to glass plates was tested. The testing procedures are described below.

(i) Impact resistance test

Conducted according to JIS R 3205. Laminated glass was kept at 23° C. and a relative humidity of 50% for 4 hours, and it was held vertically by a support frame. An impacting object with a weight of 45 kg and a maximum diameter of 75 mm was dropped from a height of 30 cm, with a free fall pendulum motion, into the center of the laminated glass. If it created an opening through which a sphere with a 75 mm diameter can freely go, then the result was indicated as "X", and if not the result was indicated as "circle".

(ii) Transparency test

Integral turbidity meter (Sekibun-shiki Dakudo-kei available from Tokyo Denshoku Co.) was used to measure the total light transmittance (%) and the haze value (%). The test was conducted with n=10.

(iii) Thermal shock test

One cycle was defined as a process in which a sample was let stand for 2 hours at 70° C., cooled from 70° C. to −20° C. over the course of 2 hours, let stand for 2 hours at −20° C., and then heated from −20° C. to 70° C. over the course 2 hours. The sample were checked for peeled layers after 10 cycles.

(iv) Moisture resistance test

A sample was let stand for 2 weeks at 55° C. and an ambient relative humidity of 98%, and then checked for peeled layers.

(v) Boiling test

A sample was let stand for 2 hours in boiling water, and then checked for peeled layers.

(vi) Adhesive property to glass plate or synthetic resin plates

The glass plate for the adhesion strength measurement was kept at 23° C. and a relative humidity of 50% for 4 hours, and cut into 2 cm wide, approximately 10 cm long strips. The 90 degree peel strength (kg/cm) of the strips was measured using a constant speed tensile tester (Tensilon ® UCE 500 available from Orientech Co.) at a drawing speed of 500 mm/min. The testing was conducted with n=10.

The results are shown in Tables 11 to 14. The interlayer films of the laminated glass used in Comparative Examples 24 and 25 had turned into hard rubbery elastic materials and did not maintain the adhesive force.

TABLE 11

| | Total light transmittance (%) | Haze (%) | Peel strength (kg/cm) | Impact resistance test | Peeling Thermal shock test | Peeling Moisture resistance test | Peeling Boiling test |
|---|---|---|---|---|---|---|---|
| Example 1 | 88.8 | 0.4 | >5.0 | ○ | Not observed | Not observed | Not observed |
| Example 2 | 89.2 | 0.7 | >5.0 | ○ | Not observed | Not observed | Not observed |
| Example 3 | 87.1 | 0.4 | >5.0 | ○ | Not observed | Not observed | Not observed |
| Example 4 | 87.6 | 0.3 | >5.0 | ○ | Not observed | Not observed | Not observed |
| Example 5 | 87.7 | 0.6 | >5.0 | ○ | Not observed | Not observed | Not observed |
| Example 6 | 87.2 | 0.4 | >5.0 | ○ | Not observed | Not observed | Not observed |
| Example 7 | 88.8 | 0.4 | >5.0 | ○ | Not observed | Not observed | Not observed |
| Example 8 | 87.3 | 0.5 | >5.0 | ○ | Not observed | Not observed | Not observed |
| Example 9 | 87.8 | 0.7 | >5.0 | ○ | Not observed | Not observed | Not observed |
| Example 10 | 89.0 | 0.5 | >5.0 | ○ | Not | Not | Not |

TABLE 11-continued

| | Total light transmittance (%) | Haze (%) | Peel strength (kg/cm) | Impact resistance test | Peeling Thermal shock test | Peeling Moisture resistance test | Peeling Boiling test |
|---|---|---|---|---|---|---|---|
| Example 11 | 87.2 | 0.5 | >5.0 | ○ | Not observed | Not observed | Not observed |
| Example 12 | 88.8 | 0.5 | >5.0 | ○ | Not observed | Not observed | Not observed |
| Example 13 | 88.7 | 0.4 | >5.0 | ○ | Not observed | Not observed | Not observed |
| Example 14 | 87.5 | 0.4 | >5.0 | ○ | Not observed | Not observed | Not observed |
| Example 15 | 87.5 | 0.3 | >5.0 | ○ | Not observed | Not observed | Not observed |
| Example 16 | 89.6 | 0.4 | >5.0 | ○ | Not observed | Not observed | Not observed |
| Example 17 | 87.3 | 0.5 | >5.0 | ○ | Not observed | Not observed | Not observed |
| Example 18 | 87.7 | 0.4 | >5.0 | ○ | Not observed | Not observed | Not observed |
| Example 19 | 87.1 | 0.5 | >5.0 | ○ | Not observed | Not observed | Not observed |
| Example 20 | 86.8 | 0.4 | >5.0 | ○ | Not observed | Not observed | Not observed |

TABLE 12

| | Total light transmittance (%) | Haze (%) | Peel strength (kg/cm) | Impact resistance test | Peeling Thermal shock test | Peeling Moisture resistance test | Peeling Boiling test |
|---|---|---|---|---|---|---|---|
| Example 21 | 87.1 | 0.6 | >5.0 | ○ | Not observed | Not observed | Not observed |
| Example 22 | 87.2 | 0.5 | >5.0 | ○ | Not observed | Not observed | Not observed |
| Example 23 | 89.1 | 0.7 | >5.0 | ○ | Not observed | Not observed | Not observed |
| Example 24 | 88.6 | 0.9 | >5.0 | ○ | Not observed | Not observed | Not observed |
| Example 25 | 89.1 | 0.6 | >5.0 | ○ | Not observed | Not observed | Not observed |
| Example 26 | 88.6 | 0.5 | >5.0 | ○ | Not observed | Not observed | Not observed |
| Example 27 | 88.8 | 0.6 | >5.0 | ○ | Not observed | Not observed | Not observed |
| Example 28 | 89.2 | 0.4 | >5.0 | ○ | Not observed | Not observed | Not observed |
| Example 29 | 87.7 | 0.4 | >5.0 | ○ | Not observed | Not observed | Not observed |
| Example 30 | 87.1 | 0.6 | >5.0 | ○ | Not observed | Not observed | Not observed |
| Example 31 | 87.5 | 0.3 | >5.0 | ○ | Not observed | Not observed | Not observed |
| Example 32 | 89.3 | 0.5 | >5.0 | ○ | Not observed | Not observed | Not observed |
| Example 33 | 87.7 | 0.4 | >5.0 | ○ | Not observed | Not observed | Not observed |
| Example 34 | 87.1 | 0.6 | >5.0 | ○ | Not observed | Not observed | Not observed |
| Example 35 | 89.3 | 0.5 | >5.0 | ○ | Not observed | Not observed | Not observed |
| Example 36 | 86.7 | 0.6 | >5.0 | ○ | Not observed | Not observed | Not observed |
| Example 37 | 85.1 | 0.5 | >5.0 | ○ | Not observed | Not observed | Not observed |
| Example 38 | 85.6 | 0.5 | >5.0 | ○ | Not observed | Not observed | Not observed |
| Example 39 | 87.3 | 0.6 | >5.0 | ○ | Not observed | Not observed | Not observed |
| Example 40 | 86.6 | 0.7 | >5.0 | ○ | Not observed | Not observed | Not observed |

TABLE 13

| | Total light transmittance (%) | Haze (%) | Peel strength (kg/cm) | Impact resistance test | Peeling Thermal shock test | Peeling Moisture resistance test | Peeling Boiling test |
|---|---|---|---|---|---|---|---|
| Comparative Example 1 | 88.2 | 3.2 | 0.003 | x | observed | observed | observed |
| Comparative Example 2 | 88.8 | 0.4 | 0.003 | x | observed | observed | observed |
| Comparative Example 3 | 88.2 | 3.2 | >5.0 | ○ | Not observed | Not observed | Not observed |
| Comparative Example 4 | 69.0 | 0.4 | 0.003 | x | observed | observed | observed |
| Comparative Example 5 | 88.8 | 2.0 | 0.003 | x | observed | observed | observed |
| Comparative Example 6 | 89.7 | 0.5 | 0.003 | x | observed | observed | observed |
| Comparative Example 7 | 88.8 | 2.0 | >5.0 | ○ | Not observed | Not observed | Not observed |
| Comparative Example 8 | 89.8 | 0.4 | 0.003 | x | observed | observed | observed |
| Comparative Example 9 | 82.1 | 5.0 | 0.003 | x | observed | observed | observed |
| Comparative Example 10 | 87.9 | 0.5 | 0.003 | x | observed | observed | observed |
| Comparative Example 11 | 82.1 | 5.0 | >5.0 | ○ | Not observed | Not observed | Not observed |
| Comparative Example 12 | 88.7 | 0.4 | 0.003 | x | observed | observed | observed |
| Comparative Example 13 | 85.7 | 2.5 | 0.003 | x | observed | observed | observed |
| Comparative Example 14 | 88.9 | 0.6 | 0.003 | x | observed | observed | observed |
| Comparative Example 15 | 85.7 | 2.5 | >5.0 | ○ | Not observed | Not observed | Not observed |
| Comparative Example 16 | 89.3 | 0.5 | 0.003 | x | observed | observed | observed |
| Comparative Example 17 | 89.7 | 0.5 | 0.01 | x | observed | observed | observed |
| Comparative Example 18 | 89.8 | 0.4 | 0.01 | x | observed | observed | observed |
| Comparative Example 19 | 89.7 | 0.5 | 0.8 | x | observed | observed | observed |
| Comparative Example 20 | 88.9 | 1.8 | >5.0 | ○ | Not observed | Not observed | Not observed |

TABLE 14

| | Total light transmittance (%) | Haze (%) | Peel strength (kg/cm) | Impact resistance test | Peeling Thermal shock test | Peeling Moisture resistance test | Peeling Boiling test |
|---|---|---|---|---|---|---|---|
| Comparative Example 21 | 89.0 | 1.8 | >5.0 | ○ | Not observed | Not observed | Not observed |
| Comparative Example 22 | 88.9 | 1.6 | >5.0 | ○ | Not observed | Not observed | Not observed |
| Comparative Example 23 | 86.7 | 1.6 | 0.62 | ○ | observed | observed | observed |
| Comparative Example 24 | 87.7 | 0.9 | 2.7 | ○ | observed | observed | observed |
| Comparative Example 22 | 87.7 | 3.2 | 0.003 | x | observed | observed | observed |

What is claimed is:

1. An interlayer film comprising 100 weight parts of ethylene-vinyl acetate copolymer, in which the vinyl acetate content is from about 5 to 35 wt. %, 0.01 to 4 weight parts of a transparency improvement agent selected from the group consisting of a condensation reaction product of polyhydric alcohol (5 to 12-hydric) or its derivative, and twice as many equivalents of benzaldehyde, and a calixarene compound represented by the equation (II),

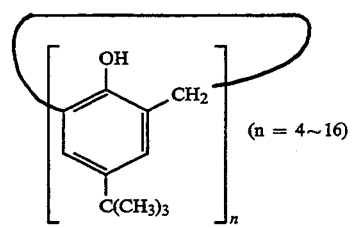

and 0.01 to 4 weight parts of a silane coupling agent which contains one or more types of groups selected from from the group consisting of amino groups, glycidyl groups and mercapto groups.

2. An interlayer film as described in claim 1, wherein said ethylene-vinyl acetate copolymer has a weight average molecular weight of $1 \times 10^4$ to $30 \times 10^4$.

3. An interlayer film as described in claim 1 wherein 0.5 to 20 weight parts of ethylene-vinyl acetate copolymer with a vinylacetate content of 5 to 35 wt % and a weight average molecular weight of $5 \times 10^2$ to $30 \times 10^2$ is added to 100 weight parts of said ethylene-vinyl acetate copolymer.

4. An interlayer film as described in claim 1 wherein said polyhydric alcohol is one or more types of polyhydric alcohol selected from sorbitol, xylitol, mannitol and dulcitol.

5. An interlayer film as described in claim 1, wherein said condensation reaction product is a dibenzylidenesorbitol compound represented by equation (I):

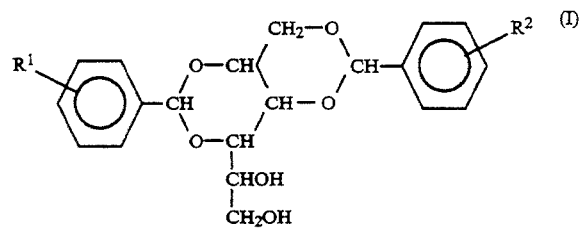

wherein $R^1$ and $R^2$ are the same or different and are hydrogen, chlorine, or alkyl groups with 1 to 6 carbon atoms.

6. An interlayer film as described in claim 1 wherein said silane coupling agent containing amino group(s) is selected from the group consisting of 3-aminopropyldimethylethoxysilane, 3-aminopropylmethyldiethoxysilane, 3-aminopropyltrimethoxysilane, 3-aminopropyltriethoxysilane, N-(2-aminoethyl)-3aminopropylmethyldimethoxysilane and N-(2-aminoethyl)-3-aminopropyltrimethoxysilane.

7. An interlayer film as described in claim 1 wherein said silane coupling agent containing glycidyl group(s) is selected from the group consisting of 3-glycidoxypropyldimethylethoxysilane, (3-glycidoxypropyl) methyldiethoxysilane and 3-glycidoxypropyltrimethoxysilane.

8. An interlayer film as described in claim 1 wherein said silane coupling agent containing mercapto group(s) is selected from the group consisting of mercaptomethyldimethylethoxysilane, (mercaptomethyl) metyldiethoxysilane, 3-mercaptopropylmethyldimethoxysilane, 3-mercaptopropyltrimethoxysilane and 3-mercaptopropyltriethoxysilane.

9. An interlayer film comprising 100 weight parts of ethylene-alkyl(meth)acrylate copolymer, in which the alkyl(meth)acrylate content is 5 to 35 wt %, 0.01 to 4 weight parts of a transparency improvement agent, selected from the group consisting of a condensation reaction product of polyhydric alcohol (5 to 12-hydric) or its derivative, and twice as many equivalents of benzaldehyde or its derivative, and a calixarene compound represented by the equation (II),

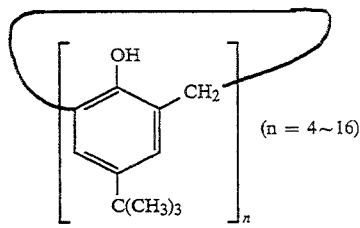

and 0.01 to 4 weight parts of a silane coupling agent which contains one or more types of groups selected from the group consisting of amino groups, glycidyl groups and mercapto groups.

10. An interlayer film as described in claim 9, wherein the ethylene-alkyl(meth)acrylate copolymer has a weight average molecular weight of 1 to $10^4$ to $30 \times 10^4$.

11. An interlayer film as described in claim 9 wherein 0.5 to 20 weight parts of ethylene-alkyl(meth)acrylate copolymer with a alkyl(meth)acrylate content of 5 to 35 wt % and a weight average molecular weight of $5 \times 10^2$ to $30 \times 10^2$ is added to 100 weight parts of said ethylene-alkyl(meth)acrylate copolymer.

12. An interlayer film as described in claim 9 wherein said polyhydric alcohol is one or more types of polyhydric alcohol selected from sorbitol, xylitol, mannitol and dulcitol.

13. An interlayer film as described in claim 9, wherein said condensation reaction product is a dibenzylidenesorbitol compound represented by equation (I):

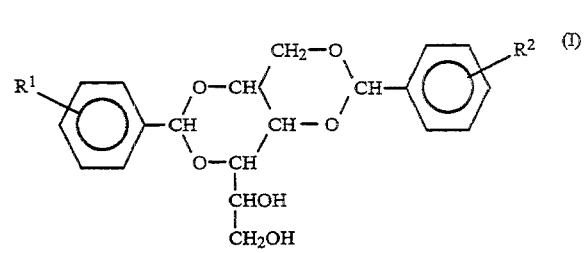

wherein $R^1$ and $R^2$ are the same or different and are hydrogen, chlorine, or alkyl groups with 1 to 6 carbon atoms.

14. An interlayer film as described in claim 9 wherein said silane coupling agent containing amino group(s) is selected from the group consisting of 3-aminopropyldimethylethoxysilane, 3-aminopropylmethyldiethoxysilane, 3-aminopropyltrimethoxysilane, 3-aminopropyltriethoxysilane, N-(2-aminoethyl)-3-aminopropylmethyldimethoxysilane and N-(2-aminoethyl)-3-aminopropyltrimethoxysilane.

15. An interlayer film as described in claim 9 wherein said silane coupling agent containing glycidyl group(s) is selected from the group consisting of 3-glycidoxypropyldimethylethoxysilane, (3-glycidoxypropyl) methyldiethoxysilane and 3-glycidoxypropyltrimethoxysilane.

16. An interlayer film as described in claim 9 wherein said silane coupling agent containing mercapto group(s) is selected from the group consisting of mercaptomethyldimethylethoxysilane, (mercaptomethyl) metyldiethoxysilane, 3-mercaptopropylmethyldimethoxysilane, 3-mercaptopropyltrimethoxysilane and 3-mercaptopropyltriethoxysilane.

17. Laminated glass formed by laminating, between 2 transparent plates selected from the group consisting of glass plates and synthetic resin plate, the interlayer film of claim 1.

18. Laminated glass formed by laminating, between 2 transparent plates selected from the group consisting of glass plates and synthetic resin plate, the interlayer film of claim 11.

* * * * *